June 14, 1960　　　　R. L. MANTLER　　　　2,940,259
ROCKET PROPELLANT INJECTOR

Filed June 21, 1955　　　　　　　　　　　　2 Sheets-Sheet 1

INVENTOR
RAYMOND L. MANTLER

BY

ATTORNEYS

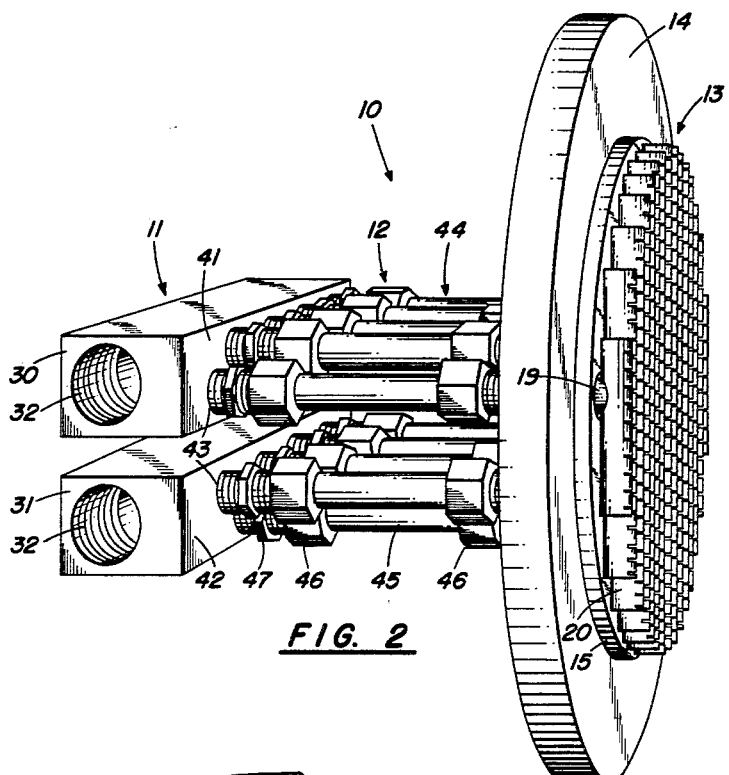
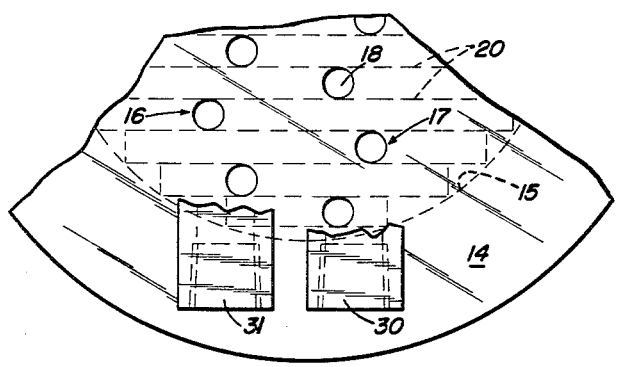

United States Patent Office 2,940,259
Patented June 14, 1960

2,940,259

ROCKET PROPELLANT INJECTOR

Raymond L. Mantler, Webster Groves, Mo., assignor, by mesne assignments, to the United States of America as represented by the Administrator of the National Aeronautics and Space Administration Filed June 21, 1955, Ser. No. 517,100

4 Claims. (Cl. 60—39.74)

(Granted under Title 35, U.S. Code (1952), sec. 266)

The invention described herein may be manufactured and used by or for the Government of the United States of America for governmental purposes without the payment of any royalties thereon or therefor.

This invention relates to propellant injectors for combustion chambers of rockets or rocket aircraft, with special adaptation to the combustion of an oxidant and a fuel.

As usually constructed the injector system of rocket combustion chambers includes a plurality of accurately drilled jet nozzles which develop impinging jet streams of propellant substances with intimate mixing. This injector system is usually complex in arrangement and costly to machine and offers difficulties in providing manifolds for close jet spacing.

Generally stated this invention contemplates the use of a plurality of parallel tubes, each slotted to provide a plurality of outlets, and alternate tubes having connection to different propellant sources. The slots of adjacent tubes are staggered to insure thorough mixing of the fuel ingredients.

Among the objects of the invention are the provision of propellant injectors so constructed as to permit close nozzle spacing. Another object is to provide a propellant injector of simple construction, permitting easy machining and developing a high degree of efficient performance. An additional object is to provide an injector which is readily scalable to any rocket engine chamber, diameter or thrust. An object also, is to provide simple manifolding for a combustion injector.

Other objects and many of the attendant advantages of this invention will be readily appreciated as the same becomes better understood by reference to the following detailed description when considered in connection with the accompanying drawings wherein:

Fig. 2 is a perspective view of the injector showing the tubular connections between the fuel and oxidant manifolds and the outlet nozzle tubes;

Fig. 4 is a detail showing the location of connector tube attachments to the nozzle plate.

Figure 1:
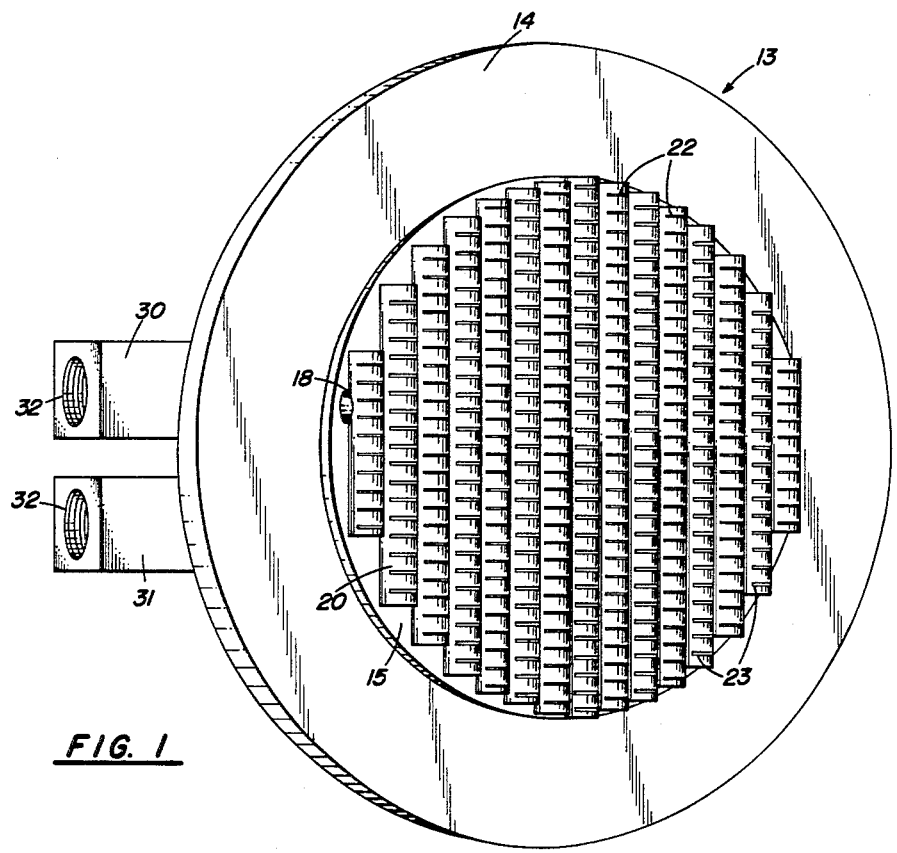
Fig. 1 is a perspective view of the injector showing the front face thereof with parallel slotted nozzle tubes.

Figs. 1 and 2 reveal the propellant injector 10 as consisting of three main sections, the manifold section 11, the connector tube section 12 and the injector tube section 13.

Figure 3:
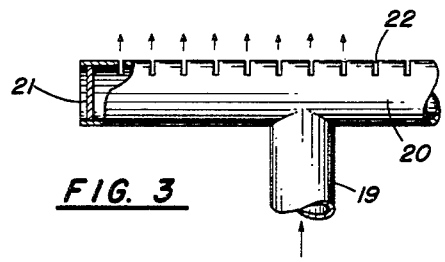
Fig. 3 is a detail of a nozzle outlet tube with milled nozzle slots formed therein.

The injector tube section 13 is formed of a circular flat supporting plate 14 having a central circular raised area 15. The raised area 15 is penetrated by two spaced pairs 16 and 17 of parallel alined apertures 18, the apertures of each pair, being successively and oppositely off-set from a medium line, moving from one end of the apertures to the other, as indicated in Fig. 4. Secured to the walls of apertures 18, as by silver solder, are a plurality of short tubes 19, and to these tubes the nozzle tubes 20 are attached, as shown in Fig. 3. Each nozzle tube is positioned at right angles to the line of plate apertures and is cylindrical in form, and of uniform cross sectional area, with ends closed as by end plates 21. The tubes, also, are milled, or otherwise processed, to form a series of equally spaced slots on the outer sides of the tube, from end to end thereof and lying at right angles to the tube axis. The depth of these slots may be varied according to specific needs but a depth of less than one-third the tube diameter or about one-half the tube radius gives satisfactory results. The slots may be of variable width for each propellant, depending on the density of the fluids. For example, the fuel slots 22 may have a width of 0.008 inch and the oxident slot a width of 0.016 inch. In order to occupy the full circular central area 15 of the support plate the nozzle tubes 20 are of shorter length where attached to the tubes 19 at the end of the line of apertures 18, and increase in length to a maximum where the tubes are adjacent the plate center. When in position, the nozzle tubes 20 form a flattened grating over the circular area 15.

As appears particularly in Fig. 1 the nozzle slots 22 of any one nozzle tube are in line with points about midway between slots on the two adjacent tubes. The reason for this slot relationship is to insure thorough mixing of the oxidant and fuel, these two propellants being forced from alternate tubes as will now be explained.

Manifold section 11 includes two manifold units 30 and 31 (see Figs. 2 and 4) each consisting of a rectangular elongated bar of suitable material having an axial bore 32 therethrough with one end of the bore plugged and the other connected to a propellant source. For example, manifold 30 may be connected to an oxidant source and manifold 31 to a fuel source, both the oxidant and fuel being preferably in the form of a fluid.

The rectangular manifold bars 30 and 31 are each flattened forming two narrowed sides 41 and 42 and a series of staggered ducts 43 are formed in both of these narrowed sides conforming in relationship to each other with that of the pairs 16 and 17 of apertures 18 formed in the support plate 14. These ducts 43 connect with the bores 32 and with the corresponding apertures in the plate 14 through the various tubes 44 of the connector tube section 12, as clearly shown in Fig. 2. The connector tubes each consist of a central straight section 45 provided with pipe unions 46 at each end joining threaded couplings 47, the couplings being threaded into correspondingly threaded ends of ducts 43 and apertures 18.

As appears from Fig. 4, successive nozzle tubes 20 are connected by tubes 45 and 44 alternatively to manifolds 30 and 31 so that different propellants are supplied to adjacent nozzle tubes. Thus, in the case of fuel and oxidant propellants, one nozzle will send out a fan shaped spray of fuel and the adjoining nozzles, sprays of oxidant. With this construction, arrangement and relationship of nozzle tubes, it will be seen that the slot form facilitates atomization and allows close contiguous spacing of the tubes; the relative size of the slots provides the correct proportion of oxidant-fuel mixture; and the slot spacing insures homogeneity of mass distribution across the face of the injector. There is thus obtained a thorough and intimate mixing of the different propellants with resulting efficient performance.

Obviously many modifications and variations of the present invention are possible in the light of the above teachings. It is therefore to be understood that within the scope of the appended claims the invention may be practiced otherwise than as specifically described.

What is claimed is:

1. An injector for propellant combustion chambers consisting of a plurality of parallel co-planar contiguous injector tubes forming a flattened grating, each tube being provided with single slots on a common grating face which are transversed to the tube axis and parallel with all other tube slots of the grating faces and displaced from alignment with the slots of the next adjacent tubes, manifolds for connections to different sources of propellants, and tubes for connecting said manifolds to said injector tubes, separate manifolds being connected to alternate injector tubes, whereby alternate spray sheets of propellants from different sources are ejected over the entire injector surface.

2. In an injector for combustion chambers, a support, a plurality of tubes mounted on said support in contiguous parallel and co-planar relation to each other to form a flattened grating, each tube having formed thereon space slots for emission of propellant from within said tube, said slots being spaced uniformly along each tube and each slot in each tube being out of line with the slots in the next joining tubes, means for supplying fluid propellant to said tubes and means for supplying different propellant fluids to adjacent tubes whereby alternate sheets of different propellants are ejected over the entire injector surface.

3. The injector, as defined in claim 2, said tubes having a uniform tubular cross-sectional area, and the slots therein having a depth not over one-third the tube diameter.

4. A propellant injector for rocket combustion chambers comprising a base, a series of uni-directional, parallel, contiguous and co-planar tubes mounted on said base, said tubes being of uniform cross-sectional area to form a flattened tube grating and each tube being provided with a series of slots transverse to the tube axis and on a common grating face, each slot of one tube being equally displaced along the tube from the line of alignment of the adjacent slots of the adjoining tubes, a first manifold for connecting alternate tubes of said grating to a fluid propellant source, and a second manifold for connecting the remaining tubes to another fluid propellant source whereby alternate sheets of different propellants are ejected over the entire injector surface.

References Cited in the file of this patent

UNITED STATES PATENTS

| | | |
|---|---|---|
| 1,220,412 | Gollmar | Mar. 27, 1917 |
| 1,791,509 | Morrow | Feb. 10, 1931 |
| 2,286,909 | Goddard | June 16, 1942 |
| 2,523,654 | Goddard | Sept. 26, 1950 |
| 2,551,112 | Goddard | May 1, 1951 |
| 2,602,290 | Goddard | July 8, 1952 |
| 2,609,658 | Goddard | Sept. 9, 1952 |
| 2,682,747 | Ruegg | July 6, 1954 |
| 2,703,962 | Olson | Mar. 15, 1955 |
| 2,753,687 | Wissley et al. | July 10, 1956 |
| 2,808,701 | Lewis | Oct. 8, 1957 |

FOREIGN PATENTS

| | | |
|---|---|---|
| 450,936 | Germany | Oct. 17, 1927 |
| 606,517 | Germany | Dec. 4, 1934 |
| 515,444 | Great Britain | Dec. 5, 1939 |